(12) United States Patent
Conte

(10) Patent No.: US 7,040,640 B2
(45) Date of Patent: May 9, 2006

(54) WHEEL ASSEMBLY FOR A VEHICLE

(75) Inventor: Bruno Conte, Redondo Beach, CA (US)

(73) Assignee: Honda Motor Company, Ltd., Tokyo (JP)

( * ) Notice: Subject to any disclaimer, the term of this patent is extended or adjusted under 35 U.S.C. 154(b) by 179 days.

(21) Appl. No.: 10/770,431

(22) Filed: Feb. 3, 2004

(65) Prior Publication Data

US 2005/0168055 A1    Aug. 4, 2005

(51) Int. Cl.
*B62K 25/04*    (2006.01)
(52) U.S. Cl. .............. 280/284; 280/284; 280/288; 301/64.201; 180/227
(58) Field of Classification Search ........... 301/64.101, 301/64.201, 73, 74, 105.1, 110.5; 180/227; 280/279, 284, 288
See application file for complete search history.

(56) References Cited

U.S. PATENT DOCUMENTS

| 1,147,415 | A | * | 7/1915 | McLeod ............... 280/284 |
| 1,167,625 | A | * | 1/1916 | Chapin ............... 180/226 |
| 2,230,193 | A | * | 1/1941 | Shinn ............... 301/63.108 |
| 4,540,062 | A |   | 9/1985 | Kashiwai |
| 4,556,119 | A |   | 12/1985 | Shiratsuchi |
| 5,071,196 | A |   | 12/1991 | Sbarro |
| 5,121,809 | A |   | 6/1992 | Sbarro |
| 5,248,019 | A |   | 9/1993 | Sbarro |
| 5,531,289 | A | * | 7/1996 | Muramatsu ............ 180/227 |
| 6,279,923 | B1 | * | 8/2001 | Cardillo et al. ........ 280/12.14 |
| 2004/0130123 | A1 | * | 7/2004 | Uneta et al. .......... 280/284 |

FOREIGN PATENT DOCUMENTS

JP          5-105170       *   4/1993

* cited by examiner

*Primary Examiner*—Russell D. Stormer
(74) *Attorney, Agent, or Firm*—Dinsmore & Shohl LLP

(57) ABSTRACT

A wheel assembly includes spaced first and second lateral supports. The first lateral support includes a first mount and the second lateral support includes a second mount that is axially aligned with the first mount. All space between the first mount and the second mount is devoid of any structural component that directly interconnects the first and second lateral supports. The wheel assembly also includes a circumferential rim structure that is adapted to support a tire. The first and second lateral supports attach to the rim structure at first and second locations, respectively, that are radially spaced from the first and second mounts, respectively. Vehicles and swing-arm assemblies including exemplary wheel assemblies are also provided.

17 Claims, 8 Drawing Sheets

WHEEL ASSEMBLY FOR A VEHICLE

TECHNICAL FIELD

The present invention relates to a wheel assembly, and more particularly to the manner in which a wheel assembly attaches to a vehicle.

BACKGROUND OF THE INVENTION

It is often desirable that a vehicle's wheels be both lightweight and stylish. A conventional motorcycle wheel, for example, typically includes a hub for receiving an axle, a rim for supporting a tire, and at least one radially extending structure connecting the hub and the rim. A single axle then passes through the hub and connects with portions of a motorcycle's frame located on each side of the wheel. This hub/axle configuration can be quite heavy and has become so commonplace among vehicles that it often provides little if any aesthetic appeal. Accordingly, there is a need for a lightweight and stylish wheel assembly for supporting a tire on a vehicle.

SUMMARY OF THE INVENTION

In accordance with the purposes of the present invention defined herein, a lightweight and stylish wheel assembly for supporting a vehicular tire is provided. In accordance with one exemplary embodiment of the present invention, the wheel assembly includes a first mount. A first extending structure is coupled with the first mount and extends radially outwardly therefrom. The first mount is adapted to provide rotational support for the first extending structure at an interface with a vehicle structure. The first mount and the first extending structure jointly form a first lateral support. The wheel assembly also includes a second mount that is axially aligned with the first mount. A second extending structure is coupled with the second mount and extends radially outwardly therefrom. The second mount is adapted to provide rotational support for the second extending structure at an interface with a vehicle structure. The second mount and the second extending structure jointly form a second lateral support with the second lateral support being spaced from the first lateral support. All space between the first mount and the second mount is devoid of any structural component that directly interconnects the first and second lateral supports. The wheel assembly also includes a circumferential rim structure. The first extending structure attaches to the rim structure at one or more first locations that are radially spaced from the first mount. The second extending structure attaches to the rim structure at one or more second locations that are radially spaced from the second mount. The rim structure is adapted to support a tire.

In accordance with another exemplary embodiment of the present invention, a vehicle is provided. The vehicle includes a frame having a first attachment location. The vehicle also includes a fork assembly having first and second elongated fork members. The first and second fork members each have first and second ends. The first end of the first fork member is operatively coupled to the first attachment location. A first axle is operatively coupled with the first fork member adjacent to the second end of the first fork member. A second axle is operatively coupled with the second fork member adjacent to the second end of the second fork member. The second axle is coaxially aligned with the first axle but is separated from the first axle such that a space is provided between the first and second axles. A wheel assembly is rotatable with respect to the fork assembly and has a first radially extending structure operatively coupled with the first axle and a second radially extending structure operatively coupled with the second axle. The second radially extending structure is spaced from the first radially extending structure. The wheel assembly further comprises a circumferential rim structure. The first radially extending structure attaches to the rim structure at one or more first locations that are radially spaced from the first axle and the second radially extending structure attaches to the rim structure at one or more second locations that are radially spaced from the second axle. The rim structure is adapted to support a tire.

In accordance with yet another exemplary embodiment of the present invention, a swing-arm assembly for a vehicle is provided. The swing-arm assembly includes a fork assembly having first and second elongated fork members. The first and second fork members each have a first end and a second end. The first ends of the first and second fork members are configured for operative coupling to a vehicle. A first axle is operatively coupled with the first fork member adjacent to the second end of the first fork member. A second axle is operatively coupled with the second fork member adjacent to the second end of the second fork member. The second axle is coaxially aligned with the first axle but is spaced from the first axle such that a space is provided between the first and second axles. A wheel assembly is rotatably provided with respect to the fork assembly. The wheel assembly has a first radially extending structure that is operatively coupled with the first axle and a second radially extending structure that is operatively coupled with the second axle. The second radially extending structure is spaced from the first radially extending structure. The wheel assembly further includes a circumferential rim structure. The first radially extending structure attaches to the rim structure at one or more first locations that are radially spaced from the first axle and the second radially extending structure attaches to the rim structure at one or more second locations that are radially spaced from the second axle. The rim structure is adapted to support a tire.

The wheel assembly as described herein is advantageous as providing lightweight and stylish support for a vehicular tire. Additional embodiments, advantages, and novel features of the invention will be set forth in part in the description that follows, and in part will become apparent to those skilled in the art upon examination of the following or may be learned with the practice of the invention. The advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
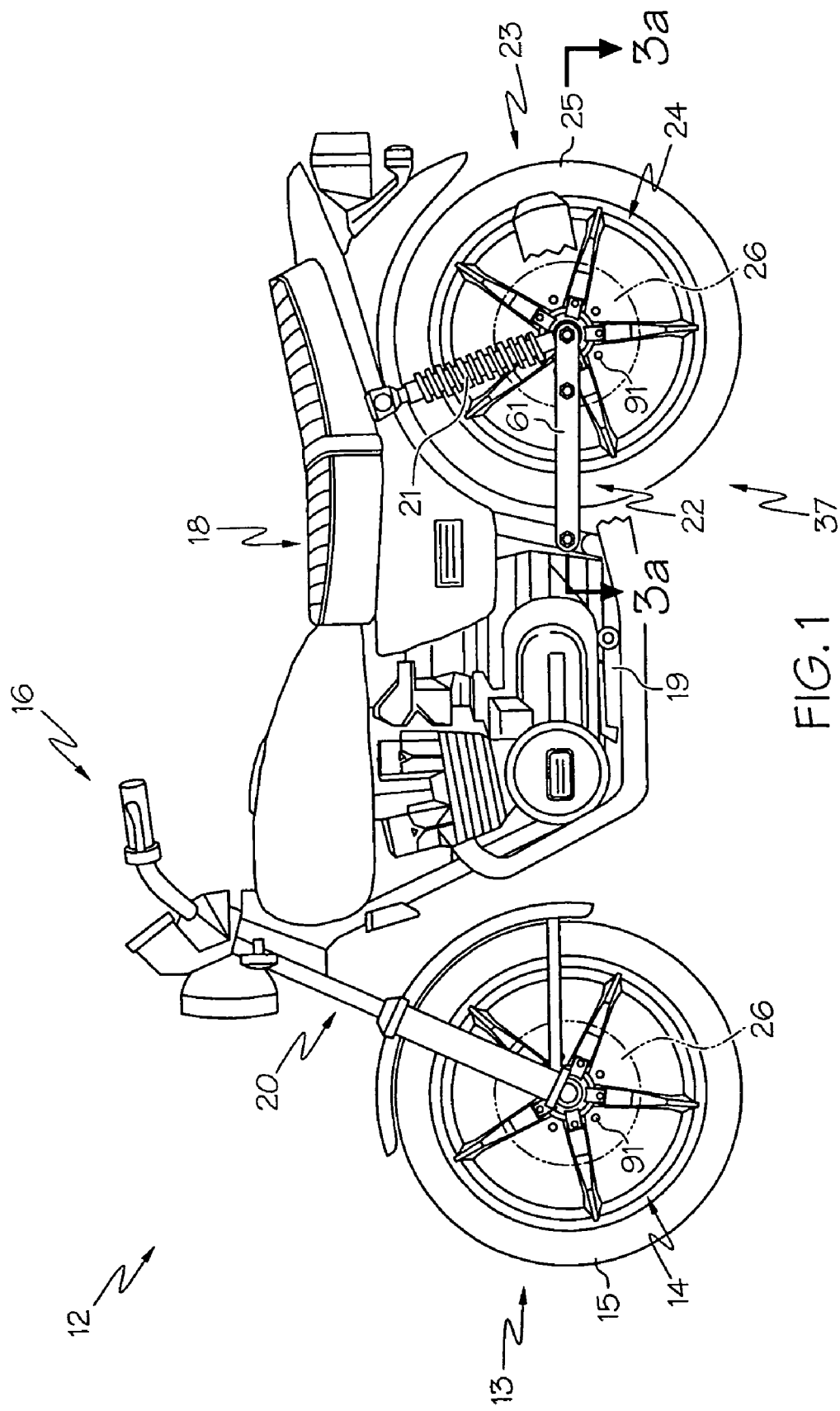
FIG. 1 is a side plan view of a motorcycle having a rear wheel assembly in accordance with one exemplary embodiment of the present invention.

Exemplary embodiments of the invention and its operation are hereinafter described in detail in connection with the views and examples of FIGS. 1, 2a–2e, and 3a–3b, wherein like numbers indicate the same or corresponding elements throughout the views. As shown in FIG. 1, a motorcycle 12 can include a frame 19 with which a seat 18, a front fork assembly 20, and a rear swing-arm assembly 37 can be associated. Handlebars 16 and a front wheel 13 can be coupled to the front fork assembly 20. The rear swing-arm assembly 37 can include a rear fork assembly 22 that, in conjunction with a rear suspension component 21 (e.g., a spring, strut, and/or shock absorber), rotatably supports a rear wheel 23 with respect to the frame 19.

The front wheel 13 is depicted as comprising a front wheel assembly 14 and a front tire 15. Similarly, the rear wheel 23 is shown as comprising a rear wheel assembly 24 and a rear tire 25. Both the front wheel assembly 14 and the rear wheel assembly 24 are shown to include respective brake discs 26. Although the front wheel 13 and the rear wheel 23 are depicted similarly in FIG. 1, it should be understood that a vehicle in accordance with the present invention might include one or more wheels that have a different configuration and/or appearance than other wheels that are associated with that same vehicle. It should also be appreciated that wheel assemblies in accordance with the present invention can be employed as one or more front wheel(s) and/or rear wheel(s) of a vehicle.

Figure 2A:
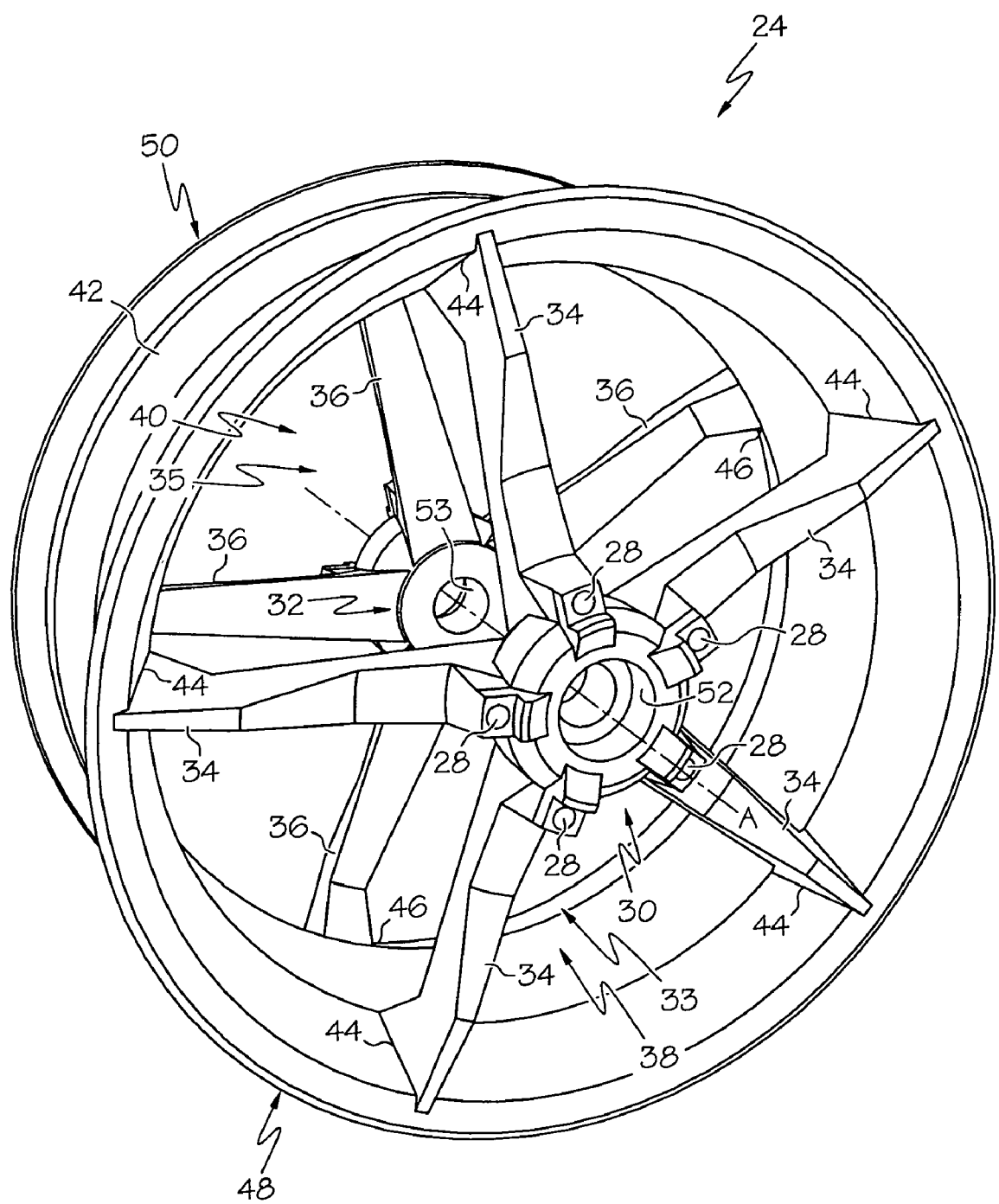
FIG. 2*a* is a perspective view generally depicting the rear wheel assembly of FIG. 1 (with the brake disc removed for clarity)

Turning now to FIG. 2a, an enlarged and more detailed view of the exemplary rear wheel assembly 24 is depicted (although the brake disc 26 has been removed for clarity). The rear wheel assembly 24 includes a first lateral support 38, a second lateral support 40, and a circumferential rim structure 42. The first lateral support 38 includes a first mount 30 and a first radially extending structure 33. The first mount 30 is adapted to provide rotational support for the first extending structure 33 at an interface with an associated vehicle structure (e.g., a first axle). More particularly, the first mount 30 can include an aperture 52 that is adapted to receive a first vehicular axle (as shown and discussed more fully hereinafter). In alternate embodiments, as will be discussed, the first mount can assume any of a variety of different configurations, and might for example include an integral axle (e.g., as shown in FIG. 2e).

Figure 2B:
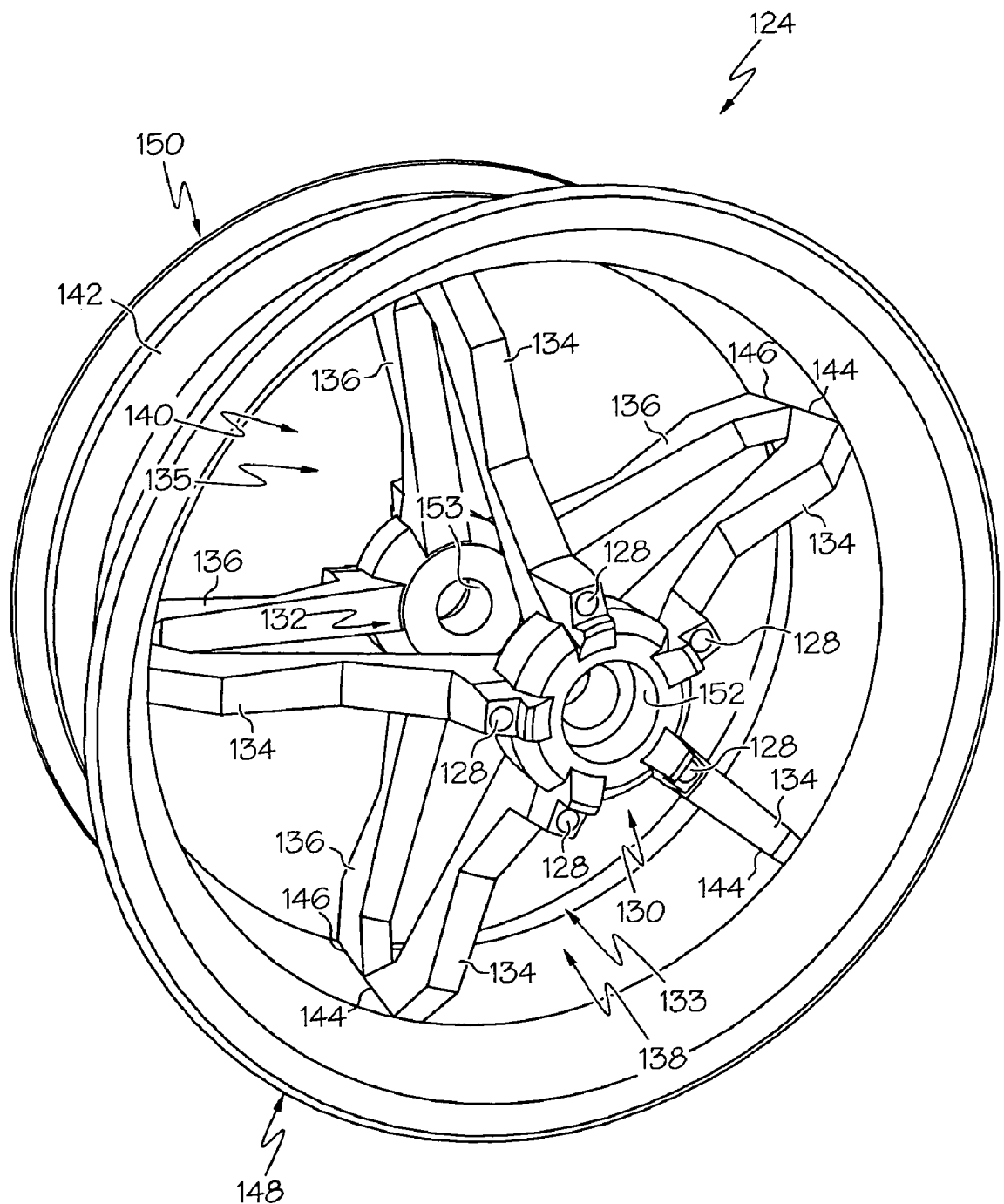
FIG. 2*b* is a perspective view depicting a wheel assembly in accordance with another exemplary embodiment of the present invention.
Figure 2C:
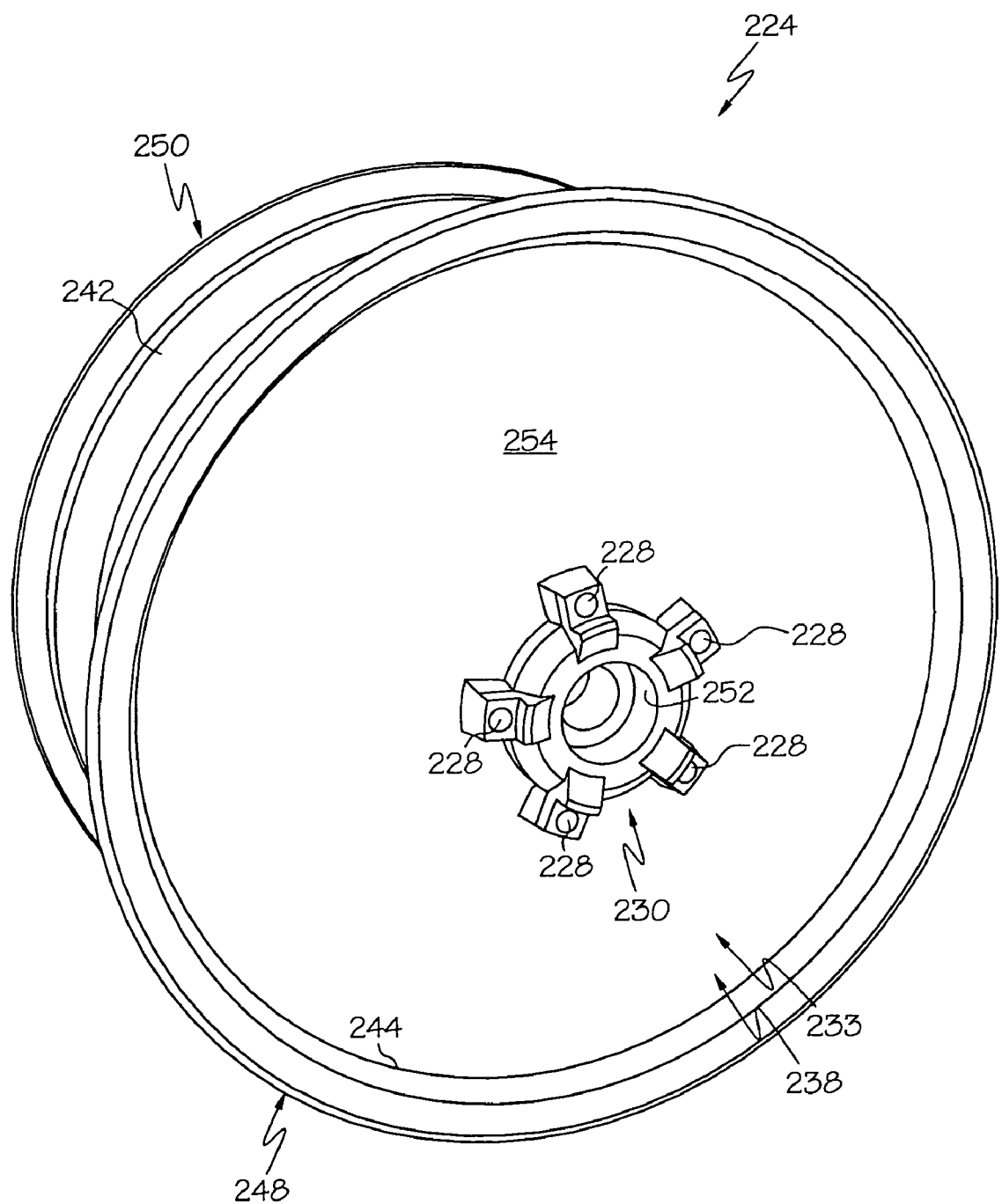
FIG. 2c is a perspective view depicting a wheel assembly in accordance with yet another exemplary embodiment of the present invention.

The first extending structure 33 can be coupled with the first mount 30 and can extend radially outwardly therefrom. The first extending structure 33 can include a variety of specific configurations for radially connecting the first mount 30 to the rim structure 42. In the embodiment depicted in FIG. 2a, the first extending structure 33 is depicted as including five spokes 34. It should be understood, however, that the first extending structure 33 can include fewer or greater than five spokes, or alternatively could include a disc or other structure in lieu of such spokes (e.g., as shown in FIG. 2c). It should be further appreciated that the first extending structure 33 can be formed integrally (e.g., through casting, molding or machining) with the first mount 30 or can alternatively be attached thereto with welding, fasteners, adhesives, or another suitable means of attachment.

The second lateral support 40 includes a second mount 32 and a second radially extending structure 35. The second mount 32 is adapted to provide rotational support for the second extending structure 35 at an interface with an associated vehicle structure (e.g., a second axle). More particularly, the second mount 32 can include an aperture 53 that is adapted to receive a second vehicular axle (as shown and discussed more fully hereinafter).

Figure 2D:
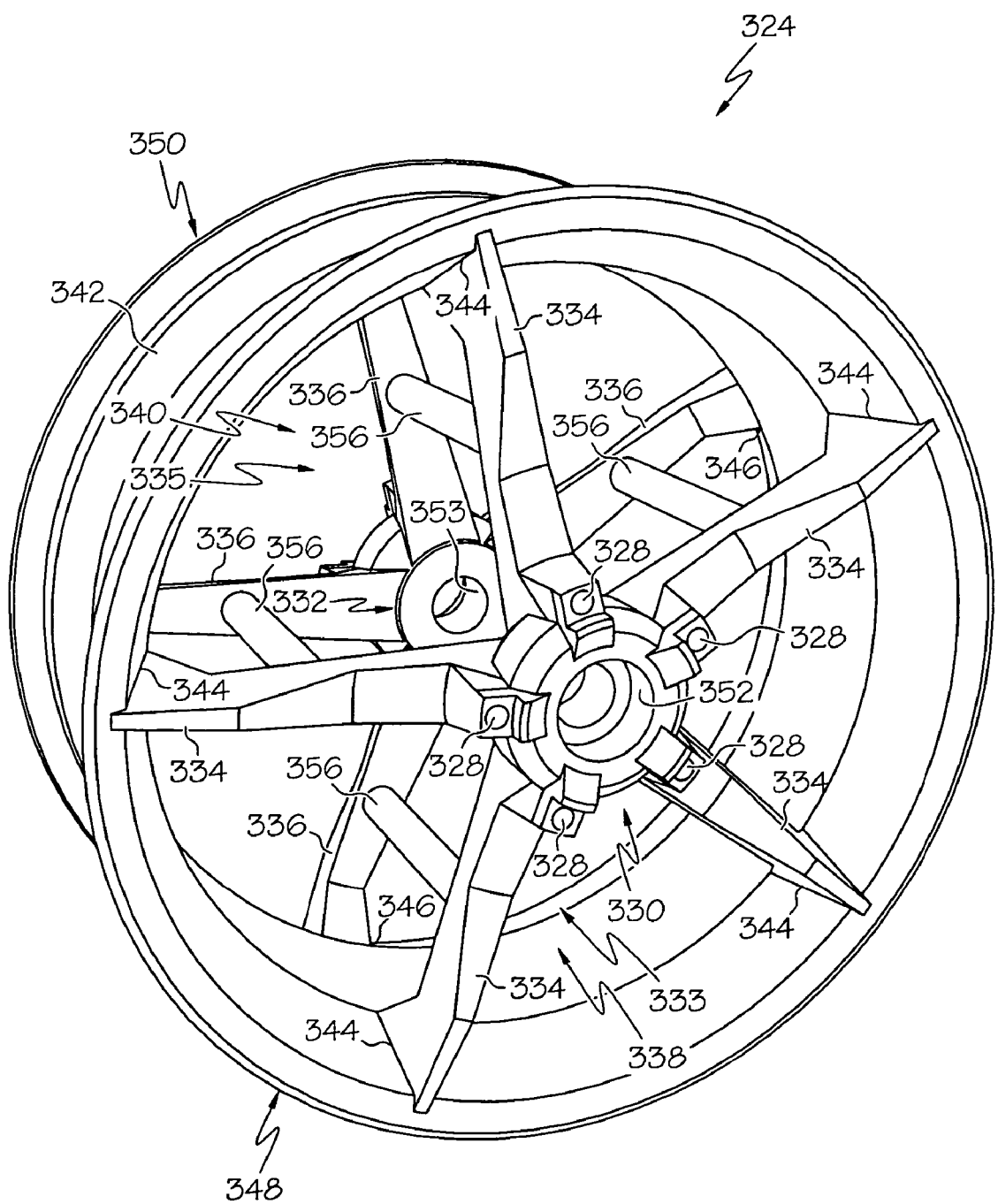
FIG. 2d is a perspective view depicting a wheel assembly in accordance with still another exemplary embodiment of the present invention.
Figure 2E:
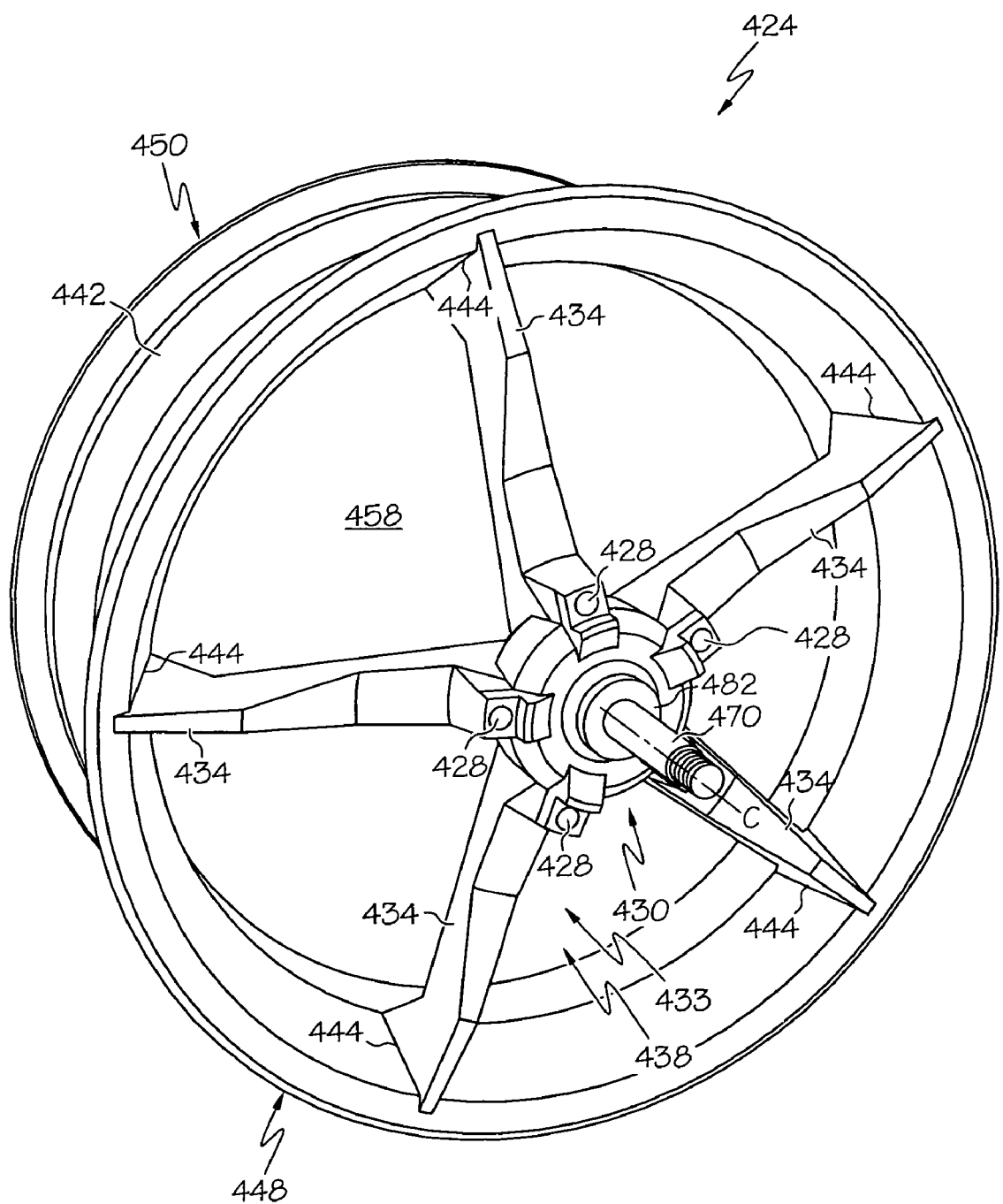
FIG. 2e is a perspective view depicting a wheel assembly in accordance with another exemplary embodiment of the present invention.
Figure 3A:
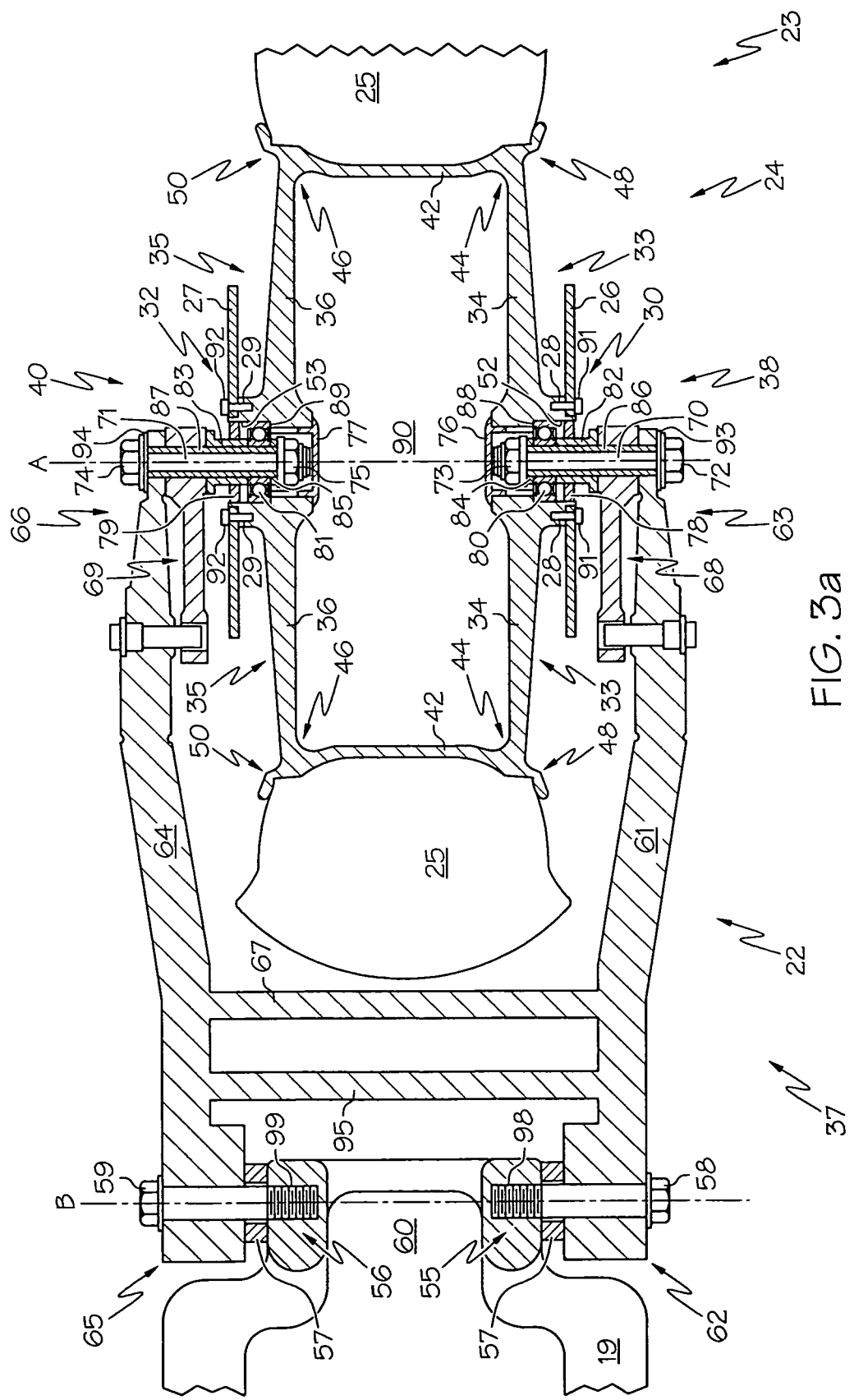
FIG. 3a is a simplified composite of two partial sectional views taken along section line 3a—3a in FIG. 1 and depicts one embodiment of a rear swing-arm assembly in accordance with the teachings of the present invention.
Figure 3B:
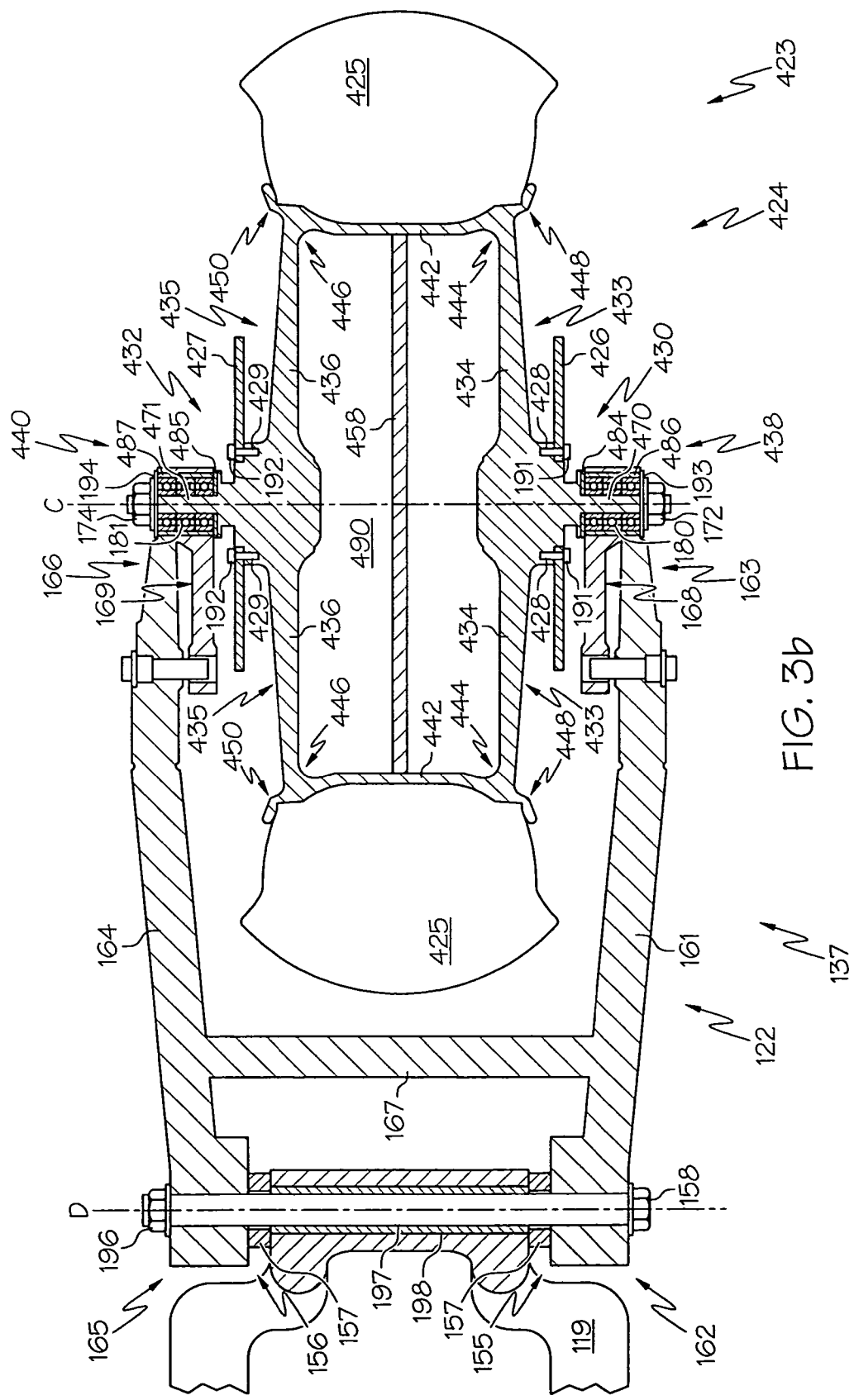
FIG. 3b is a simplified composite of two partial sectional views depicting a rear swing-arm assembly in accordance with another exemplary embodiment of the present invention.

FIGS. 3a and 3b generally include, among other things, simplified cross-sectional depictions of the wheel assemblies 24, 424 of FIGS. 2a and 2e, respectively. These cross-sectional depictions of the wheel assemblies 24, 424 are simplified in two major respects. First, because each of the specifically illustrated wheel assemblies 24 and 424 includes two lateral supports (e.g., 38, 40 and 438, 440, respectively), and each of the lateral supports illustrated in FIGS. 2a and 2e involves five spokes that are not co-linearly aligned, a single cross-sectional view would not clearly portray two spokes of a single lateral support. Accordingly, for purposes of clarity of illustration, FIGS. 3a and 3b are composite sectional views that each simultaneously depict two rotational positions of a single wheel assembly, and accordingly simultaneously portray two spokes of each lateral support in apparent co-linear alignment. Second, FIGS. 3a and 3b are shown to omit certain shape or geometric details of the lateral supports (e.g., the spokes) that are shown in FIGS. 2a and 2e, respectively. It is believed that these simplifications will aid the reader in appreciating and better understanding the disclosure provided herein.

As depicted in FIGS. 2a and 3a, the first and second mounts 30, 32 can be coaxially aligned (e.g., along axis "A", so as to receive coaxially aligned vehicular axles) but can be spaced from each other by space 90 (shown in FIG. 3a). In alternate embodiments, as will be discussed, the second mount can assume a variety of different configurations, and might for example include an integral axle (e.g., as shown in FIG. 3b). Although the first and second mounts of an exemplary wheel assembly might be similarly configured and/or might be configured to interface an associated vehicle in a similar fashion (e.g., as shown in FIGS. 2a and 3a), it should be appreciated that these mounts might have different configurations and/or might be configured to interface with the associated vehicle in different manners.

The second extending structure 35 can be coupled with the second mount 32 and can extend radially outwardly therefrom. The second extending structure 35 can include any of a variety of specific configurations for radially connecting the second mount 32 to the rim structure 42. In the embodiment depicted in FIG. 2a, the second extending structure 35 is depicted as including five spokes 36. It should be understood, however, that the second extending structure can include fewer or greater than five spokes, or alternatively could include a disc or other structure in lieu of such spokes. It should be further appreciated that the second extending structure 35 can be formed integrally (e.g., through casting, molding or machining) with the second mount 32 or can alternatively be attached thereto with welding, fasteners, adhesives, or another suitable means of attachment. An exemplary wheel assembly might include similar first and second extending structures (e.g., both including five spokes as depicted in FIG. 2*a*). However, other exemplary wheel assemblies might include differing first and second extending structures (e.g., a first extending structure might include spokes while a second extending structure includes a disc).

The extending structures 33, 35 can interface the rim structure 42 in any of a variety of specific manners. For example, as shown in FIG. 2*a*, the first extending structure 33 is depicted as attaching to the rim structure 42 at a plurality of first locations 44, while the second extending structure 35 is depicted as attaching to the rim structure 42 at a plurality of second locations 46. These first and second locations 44, 46 can be radially spaced from the first and second mounts 30, 32, respectively. In some embodiments (e.g., as depicted in FIG. 2*a*), the first locations 44 might be adjacent to a first edge portion 48 of the rim structure 42 and the second locations 46 might be adjacent to a second edge portion 50 of the rim structure 42. Also, in some embodiments, such as when the first and second extending structures 33, 35 are substantially parallel (e.g., see FIG. 2*a*), or when the first and second lateral supports 38, 40 are substantially parallel (e.g., also see FIG. 2*a*), the first locations 44 might be spaced from the second locations 46 across the rim structure 42. However, in certain other embodiments, the first locations might be substantially adjacent to the second locations (e.g., as depicted in FIG. 2*b*). Although the rim structure 42 might be formed integrally (e.g., through casting, molding or machining) with the first and/or second extending structures 33, 35, it should be appreciated that the interfaces between the rim structure 42 and the first and/or second extending structures 33, 35 might alternatively include welding, fasteners, adhesives, or another suitable means of attachment. In the embodiment of the present invention depicted in FIG. 2*a*, the rim structure 42 is cast integrally with the mounts 30, 32 and with the extending structures 33, 35, and is the only component of the rear wheel assembly 24 that provides a direct and structural connection between the first and second lateral supports 38, 40.

The rim structure 42 can be adapted to support a vehicular tire 25, as shown for example in FIGS. 1 and 3*a*. The tire may be an air-filled tire of either the tubeless or tube-containing variety, or might alternatively comprise a solid rubber or solid plastic tire (i.e.: not air-filled). In one exemplary embodiment of the present invention, the rim structure 42 is adapted to support an air-filled tire of the tubeless variety.

An exemplary wheel assembly in accordance with the teachings of the present invention includes spaced lateral supports. The space (e.g., 90 in FIG. 3*a*) between the first and second mounts of these lateral supports can be devoid of any structural component that directly interconnects the first and second lateral supports (or that directly interconnects either the first mount or the first radially extending structure with either the second mount or the second radially extending structure). In this manner, the space (e.g., 90 in FIG. 3*a*) between the first and second mounts can be left free from any structural component. In other words, an exemplary wheel assembly in accordance with the present invention does not include a hub that extends from one lateral support to the other (as does a conventional wheel assembly). Also, when an exemplary wheel assembly (e.g., 24) is installed onto an exemplary vehicle (e.g., as depicted in FIG. 3*a*), no axle extends between the first and second mounts (e.g., 30, 32). In another embodiment, all space between the first and second radially extending structures 33, 35 is devoid of any structural component. In yet another embodiment, all space between the first and second lateral supports 38, 40 is devoid of any structural component that directly interconnects the first and second lateral supports.

It should be appreciated, however, that any of a variety of non-structural but decorative components might be disposed within some or all of the space located between the mounts 30, 32 and/or between the lateral supports 38, 40. For example, a central disc (e.g., 458 as shown in FIGS. 2*e* and 3*b*) might be provided at least partially within this space (e.g., 490 in FIG. 3*b*). As another example, a decorative insert can be provided to connect the first and second mounts so as to substantially simulate the appearance of a conventional hub, but that will enable the associated wheel assembly to retain the weight advantages discussed above. However, in some embodiments (e.g., as in FIG. 2*a*), all space between the first and second mounts 30, 32 and/or between the first and second lateral supports 38, 40 is further devoid of any non-structural component that directly interconnects the first and second lateral supports. In such embodiments, all space between the first and second mounts 30, 32 extends continuously and radially to the rim structure 42.

The first and second lateral supports 38, 40 can include provisions for interfacing a brake member and/or a drive member. The brake member can comprise a brake disc (e.g., 26 in FIG. 1), for example, that can be selectively engaged by an associated brake caliper in order to cease or prevent rotation of the associated wheel. The drive member can facilitate powered rotation of an associated wheel and can include, for example, a drive pulley for interfacing a drive belt and/or a drive gear for interfacing a drive chain.

In some embodiments of the present invention, one or more brake members and/or drive members might be formed integrally with a lateral support of an exemplary wheel assembly. Alternative provisions for supporting a brake member and/or a drive member upon an associated wheel assembly can include fasteners, adhesives, clips, retaining rings, tabs, and/or any of a variety of suitable mechanical connections. For example, as shown in FIG. 2*a*, the brake/drive member support provisions can include one or more apertures 28 associated with the first lateral support 38. These apertures 28 can comprise threaded apertures adapted to receive screws (e.g., 91 in FIG. 1) for securing a brake member (e.g., 26 in FIG. 1) and/or a drive member to the first lateral support 38. Similar apertures (e.g., 29 in FIG. 3*a*) might additionally or alternatively be provided by the second lateral support 40 to receive screws (e.g., 92 in FIG. 3*a*) for securing a brake member and/or a drive member (e.g., 27 in FIG. 3*a*) to the second lateral support 40. Hence, as shown in FIG. 3*a*, a brake disc (e.g., 26) might be operatively coupled with one lateral support (e.g., 38) of the rear wheel assembly 24, while a drive gear (e.g., 27) is operatively coupled with another lateral support (e.g., 40) of the rear wheel assembly 24. However, it should be appreciated that a brake disc and a drive gear could both be operatively coupled with the same lateral support. It should also be appreciated that both lateral supports of a rear wheel assembly can each be operatively coupled to a respective brake disc and a respective drive gear. Many of these configurations would also be applicable to other vehicular wheels (e.g., the front wheel 13).

Turning now to FIG. 2b, an alternate exemplary rear wheel assembly 124 is depicted. The rear wheel assembly 124 includes a first lateral support 138, a second lateral support 140 and a circumferential rim structure 142. The first lateral support 138 includes a first mount 130 and a first radially extending structure 133. The first mount 130 is depicted as including an aperture 152 and is adapted to provide rotational support for the first extending structure 133 at an interface with a vehicle structure (e.g., a first axle). The first extending structure 133 is depicted as including a plurality of spokes 134 that attach to the rim structure 142 at a plurality of first locations 144. The first lateral support 138 is shown to include a plurality of apertures 128 to facilitate the support of a brake member and/or a drive member as discussed above. Likewise, the second lateral support 140 includes a second mount 132 and a second radially extending structure 135. The second mount 132 can also include an aperture 153 and can be adapted to provide rotational support for the second extending structure 135 at an interface with another vehicle structure (e.g., a second axle). The second extending structure 135 is depicted as including a plurality of spokes 136 that attach to the rim structure 142 at a plurality of second locations 146. The second lateral support 140 might also include one or more apertures or other provisions for supporting a brake member and/or a drive member. The rim structure 142 can be adapted to support a tire and is shown to include a first edge portion 148 and a second edge portion 150.

The rear wheel assembly 124 depicted in FIG. 2b is similar to the rear wheel assembly 24 depicted in FIG. 2a except for two primary distinctions. First, although the first lateral support 138 and the second lateral support 140 are spaced from each other (as in FIG. 2a), the first extending structure 133 and the second extending structure 135 are not substantially parallel. Second, the first and second extending structures 133, 135 do not attach to the rim structure 142 adjacent to the first and second edge portions 148, 150 of the rim structure 142, respectively. Rather, the first and second extending structures 133, 135 attach to the rim structure 142 at locations nearer the center of the rim structure 142, and the extending structures 133, 135 accordingly taper inwardly. The embodiment of FIG. 2b can in some circumstances provide certain aesthetic, structural, aerodynamic and/or other advantages as compared to that of FIG. 2a.

Turning now to FIG. 2c, yet another alternate exemplary rear wheel assembly 224 is depicted. The rear wheel assembly 224 includes a first lateral support 238, a second lateral support (not shown) and a circumferential rim structure 242. The first lateral support 238 is shown to comprise a first mount 230 and a first extending structure 233. The first mount 230 is shown to include an aperture 252 and is adapted to provide rotational support for the first extending structure 233 at an interface with a vehicle structure (e.g., a first axle). The first extending structure 233 is shown to comprise a disc 254 that attaches to the rim structure 242 at a first location 244. In some embodiments, the first location 244 can be adjacent to a first edge portion 248 of the rim structure 242. The rim structure 242 can also include a second edge portion 250 and can be configured to support a tire.

Although not shown, it should be appreciated that a second lateral support can be provided and can include a second extending structure that interfaces the rim structure 242 adjacent to the second edge portion 250 of the rim structure 242. The second lateral support can also include a second mount for providing rotational support for the second extending structure at an interface with a vehicle structure (e.g., a second axle). The first and second lateral supports are spaced from each other, although they may or may not be substantially parallel with each other. It should also be appreciated that although the second lateral support might comprise a disc (e.g., similar to disc 254), the second lateral support might alternatively comprise any of a variety of different extending structures (e.g., spokes). Use of a disc 254 in lieu of spokes as a first and/or second extending structure can in some circumstances provide certain aesthetic, structural, aerodynamic and/or other advantages.

Another alternate exemplary rear wheel assembly 324 is depicted in FIG. 2d. The rear wheel assembly 324 is shown to include a first lateral support 338, a second lateral support 340, and a circumferential rim structure 342. The first lateral support 338 is shown to include a first mount 330 and a first extending structure 333. The first mount 330 includes an aperture 352 and is adapted to provide rotational support for the first extending structure 333 at an interface with a vehicle structure (e.g., a first axle). The first extending structure 333 is shown to include a plurality spokes 334 that extend outwardly and radially and attach to the rim structure 342 at a plurality first locations 344. Similarly, the second lateral support 340 includes a second mount 332 and a second extending structure 335. The second mount 332 is shown to be similarly configured to the first mount 330 (e.g., having an aperture 353) and can be adapted to provide rotational support for the second extending structure 335 at an interface with another vehicle structure (e.g., a second axle). The second extending structure 335 is shown to include a plurality of spokes 336 that extend outwardly and radially and attach to the rim structure 342 at a plurality of second locations 346. In one embodiment, the first locations 344 can be adjacent to a first edge portion 348 of the rim structure 342 and the second locations 346 can be spaced from the first locations 344 and can be adjacent to a second edge portion 350 of the rim structure 342. It should also be noted that the first lateral support 338 can include a plurality of apertures 328 for supporting a brake disc and/or drive gear, as discussed above, and that such provisions (e.g., apertures) might also be provided by the second lateral support 340.

The rear wheel assembly 324 of FIG. 2d is similar to the rear wheel assembly 24 of FIG. 2a except for one primary distinction. In particular, the rear wheel assembly 324 of FIG. 2d is shown to additionally include a plurality of connectors 356 for directly connecting portions of the first extending structure 333 to portions of the second extending structure 335. These connectors 356 can be disposed between the first and second extending structures 333, 335 and can directly interconnect the first and second extending structures 333, 335. More particularly, these connectors 356 are depicted as connecting each spoke 334 to each corresponding spoke 336. It should be appreciated, however, that more than one connector 356 can alternatively be associated with each spoke and/or that not all spokes might be associated with a connector 356. Hence, an exemplary wheel assembly can be provided with virtually any quantity of such connectors (e.g., 356), although the exemplary wheel assembly 324 of FIG. 2d includes five such connectors 356. Although these connectors 356 are depicted as having a generally cylindrical shape, it should be appreciated that suitable connectors can assume any of a variety of shapes and sizes. It should also be appreciated that these connectors can be used in conjunction with extending structures that do not include spokes (e.g., but rather involve discs). In some embodiments, the connectors 356 can provide structural strength and rigidity to the rear wheel assembly 324 and can accordingly be welded or otherwise attached to the first and second extending structures 333, 335. However, in other embodiments, the connectors 356 might merely be decorative and might simply be glued, compressed, or held by tension in contact with the first and second extending structures 333, 335.

FIG. 2e depicts still another exemplary embodiment of a rear wheel assembly 424 in accordance with the teachings of the present invention. The rear wheel assembly 424 includes a first lateral support 438, a second lateral support 440 (depicted in FIG. 3b), and a circumferential rim structure 442. The first lateral support 438 includes a first mount 430 and a first extending structure 433. The first mount 430 is shown to comprise a first outwardly directed axle 470 being adapted to provide rotational support for the first extending structure 433 at an interface with a vehicle structure (e.g., a first fork member 161 of a swing-arm assembly 137 as shown in FIG. 3b). The first extending structure 433 is shown to include a plurality of spokes 434 that each attach to the rim structure 442 at a plurality of first locations 444. The second lateral support 440 (shown in FIG. 3b) includes a second mount 432 and a second extending structure 435. As depicted in FIG. 3b, the second mount 432 can comprise a second outwardly directed axle 471 being adapted to provide rotational support for the second extending structure 435 at an interface with a vehicle structure (e.g., a second fork member 164 of a swing-arm assembly 137 as shown in FIG. 3b). As depicted in FIGS. 2e and 3b, the first and second axles 470, 471 can be coaxially aligned (e.g., along axis "C") but can be spaced from each other (e.g., by space 490). Also, the second extending structure 435 can include a plurality of spokes 436 that attach to the rim structure 442 at a plurality of second locations 446. (See FIG. 3b). In one embodiment, the first locations 444 can be adjacent to a first edge portion 448 of the rim structure 442, and the second locations 446 (see FIG. 3b) can be adjacent to a second edge portion 450 of the rim structure 442. It should also be noted that the first lateral support 438 can include a plurality of apertures 428 and/or other provisions for supporting a brake disc and/or drive gear, and that such provisions (e.g., apertures 429 shown in FIG. 3b) might also be provided by the second lateral support 440.

The rear wheel assembly 424 of FIG. 2e is similar to the rear wheel assembly 24 of FIG. 2a except for two primary distinctions. First, the rear wheel assembly 424 of FIG. 2e is shown to additionally include a central disc 458. A top cross-sectional view of the central disc 458 can be seen in FIG. 3b. The central disc can be provided as a structural member for reinforcing the rear wheel assembly 424, or might alternatively be provided as an aesthetic or decorative enhancement to the rear wheel assembly 424. Accordingly, the central disc 458 can be formed from any of a variety of suitable materials including metals, plastics, fiberglass, and carbon fiber. The central disc 458 can be pressed in place, glued, welded, or otherwise adhered to the rim structure 442. Alternatively, the central disc 458 can be formed integrally (e.g., through casting, molding or machining) with the rim structure 442. Second, as opposed to the apertures 52, 53 of FIG. 2a, the rear wheel assembly 424 is shown to include first and second mounts 430, 432 that comprise first and second integrated axles 470, 471, respectively. These axles can be configured to rotatably interface a rear fork assembly 122, as shown for example in FIG. 3b.

FIG. 3a depicts the association of an exemplary rear wheel assembly 24 with a motorcycle frame 19. More particularly, a rear swing-arm assembly 37 includes a rear fork assembly 22 for interfacing the rear wheel assembly 24 with the frame 19 such that the rear wheel assembly 24 is rotatable with respect to the rear fork assembly 22. The rear fork assembly 22 is shown to include a first elongated fork member 61 and a second elongated fork member 64, wherein the first fork member 61 can be at least partially parallel (and can even be substantially parallel) with the second fork member 64. The first fork member 61 includes a first end 62 and a second end 63, and the second fork member 64 includes a first end 65 and a second end 66. The first end 62 of the first fork member 61 can be operatively coupled to the frame 19 at a first attachment location 55 in any of a variety of suitable configurations. In one particular embodiment, as shown in FIG. 3a, a first fastener (e.g., a bolt 58) can pass through the first fork member 61 and into a threaded aperture 98 of the frame 19. Interface hardware 57 (e.g., a washer or bearing) can be provided to facilitate relative movement between the first fork member 61 and the frame 19. It should also be appreciated that additional or alternative bearings, collars, and/or other mechanical devices might be provided to facilitate this interface between the first end 62 of the first fork member 61 and the frame 19 at this first attachment location 55. It should also be appreciated that the fastener could comprise something other than a bolt 58, such as for example a pin or another such device. It should also be understood that the frame 19 might not include a threaded aperture (e.g., 98) for interfacing with the fastener, but might rather comprise some other suitable fastener receptacle. In still another embodiment, at least part of the fastener might be integral with the frame 19.

FIG. 3a also depicts a similar interface at a second attachment location 56 between the frame 19 and the first end 65 of the second fork member 64, although it should be understood that the first and second attachment locations 55, 56 might alternatively involve differing fasteners and/or fastening associations. More particularly, a second fastener (e.g., a bolt 59) can pass through the first end 65 of the second fork member 64 and into a threaded aperture 99 of the frame 19. Interface hardware 57 (e.g., a washer or bearing) can be provided to facilitate relative movement between the second fork member 64 and the frame 19. It should again be appreciated that the second fastener could comprise any of a variety of suitable fastening devices and may or may not be similar to that used for the first fastener.

Accordingly, the rear swing-arm assembly 37 of FIG. 3a includes a first fastener (e.g., bolt 58) and a second fastener (e.g., bolt 59) that are coaxially aligned (e.g., along axis "B" as shown in FIG. 3a) but are spaced from each other. The first fastener pivotally couples the first end 62 of the first fork member 61 to the first attachment location 55 of the frame 19. The second fastener pivotally couples the first end 65 of the second fork member 64 to the second attachment location 56 of the frame 19. By employing separate fasteners in this manner, a free space 60 can be provided between the fasteners for suitable disposition of engine components (e.g., an air cleaner) or other devices. If a single fastener (e.g., an elongated bolt or pin) were provided to facilitate the pivotal coupling of the first ends 62, 65 of both the first and second fork members 61, 64 to the frame 19, then the free space 60 would no longer be provided for disposition of such components (e.g., as shown in FIG. 3b).

First and second cross members 67, 95 of the rear fork assembly 22 can be provided to rigidly attach the first fork member 61 to the second fork member 64. It should of course be understood that fewer or additional cross members may be provided to connect the first and second fork members 61, 64. In fact, an exemplary rear fork assembly might not include any such cross members.

The rear wheel assembly 24 can be rotatably coupled with the second ends 63, 66 of the first and second fork members 61, 64, respectively. More particularly, apertures 52, 53 of the first and second support structures 30, 32, respectively, can be adapted to receive axles that are operatively coupled with the first and second fork members 61, 64 (adjacent to their second ends 63, 66), respectively. For example, as depicted in FIG. 3*a*, a bolt 72 can provide a first axle 70 that passes through a washer 93 and is then surrounded by a sleeve 86 as the bolt 72 passes through the second end 63 of the first fork member 61, through a reinforcement brace assembly 68, through a collar 82 and into the aperture 52. The collar 82 engages a bearing assembly 80 and the bearing assembly 80 presses against a lip 88 within the aperture 52. When a nut 73 is tightened onto the bolt 72, a washer 84 is compressed against the bearing assembly 80, the bearing assembly 80 is compressed against the collar 82, and the sleeve 86 is compressed against the head of the bolt 72. A seal 78 can be provided within the aperture 52 and adjacent to the collar 82 to help keep dirt and other debris from accessing the bearing assembly 80. After the nut 73 is tightened onto the bolt 72, a cover 76 can also be associated with the aperture 52 in order to hide the nut 73 and to help prevent dirt and other debris from accessing the bearing assembly 80.

Similarly, a bolt 74 can provide a second axle 71 that passes through a washer 94 and is then surrounded by a sleeve 87 as the bolt 74 passes through the second end 66 of the second fork member 64, through a reinforcement brace assembly 69, through a collar 83 and into the aperture 53. The collar 83 engages a bearing assembly 81 and the bearing assembly 81 presses against a lip 89 within the aperture 53. When a nut 75 is tightened onto the bolt 74, a washer 85 is compressed against the bearing assembly 81, the bearing assembly 81 is compressed against the collar 83, and the sleeve 87 is compressed against the head of the bolt 74. A seal 79 can be provided within the aperture 53 and adjacent to the collar 83 to help keep dirt and other debris from accessing the bearing assembly 81. After the nut 75 is tightened onto the bolt 74, a cover 77 can also be associated with the aperture 53 in order to hide the nut 75 and to help prevent dirt and other debris from accessing the bearing assembly 81.

In the above-described configuration, the first and second axles 70, 71 are coaxially aligned (along axis "A") but are spaced from each other such that a space 90 is provided longitudinally between them. This space 90 can reside centrally within the rear wheel assembly 24 (at a locus that would otherwise be occupied by the hub of a conventional wheel). By avoiding the need for any conventional hub, this exemplary rear wheel assembly conserves weight and offers aesthetic improvements as compared to conventional wheel assemblies. Furthermore, decorative effects can be disposed within this space 90 to further enhance the appearance of the wheel assembly 24.

In FIG. 3*a*, the rear wheel assembly 24 is shown to support a rear tire 25 and to thereby together provide a rear wheel 23 for a vehicle (e.g., a motorcycle). A brake disc 26 is shown as being coupled to the first lateral support 38 with bolts 91 inserted through the brake disc 26 and into the apertures 28. Likewise, a drive gear 27 is shown as being attached to the second lateral support 40 with bolts 92 inserted through the drive gear 27 and into the apertures 29. Additional and/or alternate brake members and/or drive members can be associated with an exemplary lateral support in any of a variety of specific configurations, as discussed above.

FIG. 3*b* depicts another exemplary association between an exemplary rear wheel assembly 424 and a motorcycle frame 119. In this embodiment, a rear swing-arm assembly 137 is shown to include a fork assembly 122 that interfaces the frame 119 with the rear wheel assembly 424. The rear fork assembly 122 includes a first elongated fork member 161 and a second elongated fork member 164. The first fork member includes a first end 162 and a second end 163, and the second fork member 164 includes a first end 165 and a second end 166. The first ends 162 and 165 can be operably coupled to the frame 119 and the second ends 163, 166 are operably coupled to the rear wheel assembly 424. The rear fork assembly 122 is also shown to include a cross member 167 that provides a direct and structural connection between the first fork member 161 and the second fork member 164.

The first end 162 of the first fork member 161 can attach to the frame 119 at a first attachment location 155, and the first end 165 of the second fork member 164 can attach to the frame 119 at a second attachment location 156. In one embodiment, a first fastener 158 can be provided to pivotally fasten both the first and second fork members 161, 164 to the frame 119. This first fastener 158 can comprise a bolt, pin, rod, and/or another suitable device. Interface hardware 157 (e.g., one or more washers and/or bearings) can be provided to facilitate relative movement between the first and second fork members 161, 164 and the frame 119. For example, as depicted in FIG. 3*b*, the first fastener 158 (e.g., a bolt) can pass through an aperture in the first end 162 of the first fork member 161, through any interface hardware (e.g., 157), through a sleeve 197 disposed within a channel 198 within the frame 119, through potentially more interface hardware (e.g., 157), and through an aperture formed in the first end 165 of the second fork member 164. In an embodiment wherein the first fastener 158 comprises a bolt, a nut 196 can then be provided on the end of the bolt opposite the bolt head. In this manner, both the first fork member 161 and the second fork member 164 can be pivotally coupled to the frame 119 along a single axis ("D").

The rear wheel assembly 424 is shown to support a rear tire 425 and to thereby together provide a rear wheel 423 for a vehicle (e.g., a motorcycle). A brake disc 426 is shown as being coupled to the first lateral support 438 with bolts 191 inserted through the brake disc 426 and into the apertures 428. Likewise, a drive gear 427 is shown as being attached to the second lateral support 440 with bolts 192 inserted through the drive gear 427 and into the apertures 429. Additional and/or alternate brake members and/or drive members can be associated with an exemplary lateral support in any of a variety of specific configurations, as discussed above.

The first mount 430 of the rear wheel assembly 424 includes a first axle 470 directed outwardly therefrom. The first axle 470 can pass through a washer 484 and then through a bearing assembly 180. The bearing assembly 180 can be surrounded by a sleeve 486, and the sleeve 486 can be inserted into corresponding and aligned openings through the second end 163 of the first fork member 161 and through a reinforcement brace assembly 168. A washer 193 can then be provided upon the first axle 470 and a fastener (e.g., nut 172) can then be associated with the first axle 470. Likewise, the second mount 432 of the rear wheel assembly 424 includes a second axle 471 directed outwardly therefrom. The second axle 471 can pass through a washer 485 and then through a bearing assembly 181. The bearing assembly 181 can be surrounded by a sleeve 487, and the sleeve 487 can be inserted into corresponding and aligned openings through the second end 166 of the second fork member 164 and through a reinforcement brace assembly 169. A washer 194 can then be provided upon the second axle 471 and a fastener (e.g., nut 174) can then be associated with the second axle 471.

As depicted in FIG. 3b, the first axle 470 can be integral with the first mount 430 and might even be integral with the first extending structure 433. Similarly, the second axle 471 might be integral with the second mount 432 and might even be integral with the second extending structure 435. If an axle (e.g., 470, 471) is provided integrally with a mount (e.g., 430, 432), it might be necessary to provide a slotted or channeled opening in at least one of the second ends 163, 166 of the first and/or second fork members 161, 164 in order that the wheel assembly 424 having integral and outwardly directed axles 470, 471 can be assembled therewith (because it might not be possible to spread the individual fork members outwardly over the integral axles). Regardless of the specific axle configuration, a space 490 can be provided longitudinally between the axles. This space 490 can be centrally disposed within the rear wheel assembly 424 such that no structural component passes through this space 490 to connect the first lateral support 438 to the second lateral support 440.

It should be understood that the specific mechanical interfaces between the wheel assemblies and fork assemblies disclosed herein are merely exemplary and should not be limiting. Likewise, the specific mechanical interfaces between the fork assemblies and the vehicle frames disclosed herein are merely exemplary and should not be limiting. Rather, it is contemplated that any of a significant variety of alternate mechanical configurations could provide either or both of these interfaces when an exemplary wheel assembly in accordance with the present invention is associated with a vehicle.

For example, as opposed to the specific exemplary rear fork assemblies 22 and 422 depicted in FIGS. 3a and 4b, respectively, a rear fork assembly in accordance with the present invention might alternatively involve only one fork member that directly interfaces both the wheel and the vehicle's frame (as opposed to two fork members as in FIGS. 3a and 3b). This alternate rear fork assembly might additionally include a second fork member that directly interfaces the wheel, but that connects with the first fork member instead of connecting directly with the vehicle's frame. Hence, a rear fork assembly having such a configuration might generally have an "h" shape as opposed to the "H" shape depicted in FIG. 3b.

Many of the foregoing examples specifically disclose the use of an exemplary wheel assembly in association with a motorcycle. It should, however, be appreciated that an exemplary wheel assembly in accordance with the present invention can be associated with any of a variety of vehicles including but not limited to automobiles, trucks, trailers, bicycles, aircraft, toys, and all-terrain vehicles.

The foregoing description of exemplary embodiments and examples of the invention has been presented for purposes of illustration and description. It is not intended to be exhaustive or to limit the invention to the forms described. Numerous modifications are possible in light of the above teachings. Some of those modifications have been discussed, and others will be understood by those skilled in the art. The embodiments were chosen and described in order to best illustrate the principles of the invention and various embodiments as are suited to the particular use contemplated. It is hereby intended that the scope of the invention be defined by the claims appended hereto.

What is claimed is:

1. A vehicle comprising:
a frame having a first attachment location;
a fork assembly having first and second elongated fork members, the first and second fork members each having a first end and a second end, the first end of the first fork member being operatively coupled to the first attachment location;
a first axle operatively coupled with the first fork member adjacent to the second end of the first fork member;
a second axle operatively coupled with the second fork member adjacent to the second end of the second fork member, the second axle being coaxially aligned with the first axle but being separated from the first axle such that a space is provided between the first and second axles; and,
a wheel assembly being rotatable with respect to the fork assembly and having a first radially extending structure operatively coupled with the first axle and a second radially extending structure operatively coupled with the second axle, the second radially extending structure being spaced from the first radially extending structure, the wheel assembly further comprising a circumferential rim structure, the first radially extending structure attaching to the rim structure at one or more first locations being radially spaced from the first axle, the second radially extending structure attaching to the rim structure at one or more second locations being radially spaced from the second axle, the rim structure being adapted to support a tire.

2. The vehicle of claim 1 wherein the first radially extending structure is substantially parallel with the second radially extending structure.

3. The vehicle of claim 1 wherein said first locations are spaced from said second locations.

4. The vehicle of claim 1 wherein the circumferential rim structure has first and second edge portions, said first locations being adjacent to the first edge portion and said second locations being adjacent to the second edge portion.

5. The vehicle of claim 1 wherein the frame further comprises a second attachment location to which the first end of the second fork member is operatively coupled.

6. The vehicle of claim 5 further comprising a first fastener, wherein the first fastener pivotally couples the first end of the first fork member to the first attachment location, and the first fastener also pivotally couples the first end of the second fork member to the second attachment location.

7. The vehicle of claim 5 further comprising a first fastener and a second fastener, wherein the first fastener pivotally couples the first end of the first fork member to the first attachment location and the second fastener pivotally couples the first end of the second fork member to the second attachment location, the second fastener being coaxially aligned with the first fastener but being spaced from the first fastener.

8. The vehicle of claim 1 wherein the first and second fork members are attached to each other by at least one cross member.

9. The vehicle of claim 1 further comprising a drive member and a brake member, the drive member being operatively coupled with one of the first and second radially extending structures, and the brake member being operatively coupled with the other of the first and second radially extending structures.

10. The vehicle of claim 1 wherein the vehicle is a motorcycle.

11. The vehicle of claim 1 wherein all space between the first mount and the second mount is devoid of any structural component that directly interconnects either the first mount or the first radially extending structure with either the second mount or the second radially extending structure.

12. The vehicle of claim 11 wherein all space between the first radially extending structure and the second radially extending structure is devoid of any structural component.

13. The vehicle of claim 11 further comprising a structural component disposed between the first and second radially extending structures and directly interconnecting the first and second radially extending structures.

14. A swing-arm assembly for a vehicle, the swing-arm assembly comprising:
- a fork assembly having first and second elongated fork members, the first and second fork members each having a first end and a second end, the first ends of the first and second fork members being configured for operative coupling to a vehicle;
- a first axle operatively coupled with the first fork member adjacent to the second end of the first fork member;
- a second axle operatively coupled with the second fork member adjacent to the second end of the second fork member, the second axle being coaxially aligned with the first axle but being spaced from the first axle such that a space is provided between the first and second axles; and,
- a wheel assembly being rotatable with respect to the fork assembly and having a first radially extending structure operatively coupled with the first axle and a second radially extending structure operatively coupled with the second axle, the second radially extending structure being spaced from the first radially extending structure, the wheel assembly further comprising a circumferential rim structure, the first radially extending structure attaching to the rim structure at one or more first locations being radially spaced from the first axle, the second radially extending structure attaching to the rim structure at one or more second locations being radially spaced from the second axle, the rim structure being adapted to support a tire.

15. The swing-arm assembly of claim 14 wherein the first and second fork members are attached to each other by at least one cross member.

16. The swing-arm assembly of claim 14 further comprising a drive member and a brake member, the drive member being operatively coupled with one of the first and second radially extending structures, and the brake member being operatively coupled with the other of the first and second radially extending structures.

17. The swing-arm assembly of claim 14 being configured for association with a motorcycle.

* * * * *